United States Patent
Henning et al.

[11] Patent Number: 5,944,077
[45] Date of Patent: Aug. 31, 1999

[54] EQUIPMENT INCLUDING A MOTOR-DRIVEN CHAIN SAW FOR CUTTING BRANCHES FROM AND FELLING TREES

[76] Inventors: Peter Henning; Volker Rothkegel, both of Steindamm 37, 25485 Hemdingen, Germany

[21] Appl. No.: 08/930,941

[22] PCT Filed: Jan. 16, 1996

[86] PCT No.: PCT/EP96/00154
  § 371 Date: Jan. 20, 1998
  § 102(e) Date: Jan. 20, 1998

[87] PCT Pub. No.: WO96/32006
  PCT Pub. Date: Oct. 17, 1996

[30] Foreign Application Priority Data

Apr. 13, 1995 [DE] Germany ............. 295 06 409 U

[51] Int. Cl.[6] .............. A01G 23/083; A01G 23/095
[52] U.S. Cl. .............. 144/4.1; 144/24.13; 144/336; 144/343; 144/34.1
[58] Field of Search ............. 144/4.1, 24.13, 144/335, 336, 338, 343, 34.1; 83/928

[56] References Cited

U.S. PATENT DOCUMENTS

| | | | |
|---|---|---|---|
| 3,542,099 | 11/1970 | Gibson | 144/4.1 |
| 3,606,915 | 9/1971 | Lindblom | 144/24.13 |
| 3,763,904 | 10/1973 | Eynon | 144/24.13 |
| 3,885,610 | 5/1975 | Forslund et al. | 144/4.1 |
| 3,911,981 | 10/1975 | Tucek | 144/4.1 |
| 4,569,379 | 2/1986 | Gemmell-Murdoch | 144/4.1 |

*Primary Examiner*—W. Donald Bray
*Attorney, Agent, or Firm*—Friedrich Kueffner

[57] ABSTRACT

The device for the disbranching and felling of trees is provided with a chain saw (110) and possesses a seizing means (15,16,17) swivelling relative to the blade (22) of the chain saw with a plurality of grabbing arms that are swivellable about a common axis (13), in which case the device (100) with the grabbing arms (15,16,17), whose bearing brackets and the chain saw (110), with the aid of a slewing means, which swivels the device in each case through 180° to the right or to the left, is connected with a lifting means, while the chain saw (110) with its driving motor, with the aid of a swivel motor to which the chain saw (110) is secured, is swivellable through the cutting area (FIG.1).

9 Claims, 5 Drawing Sheets

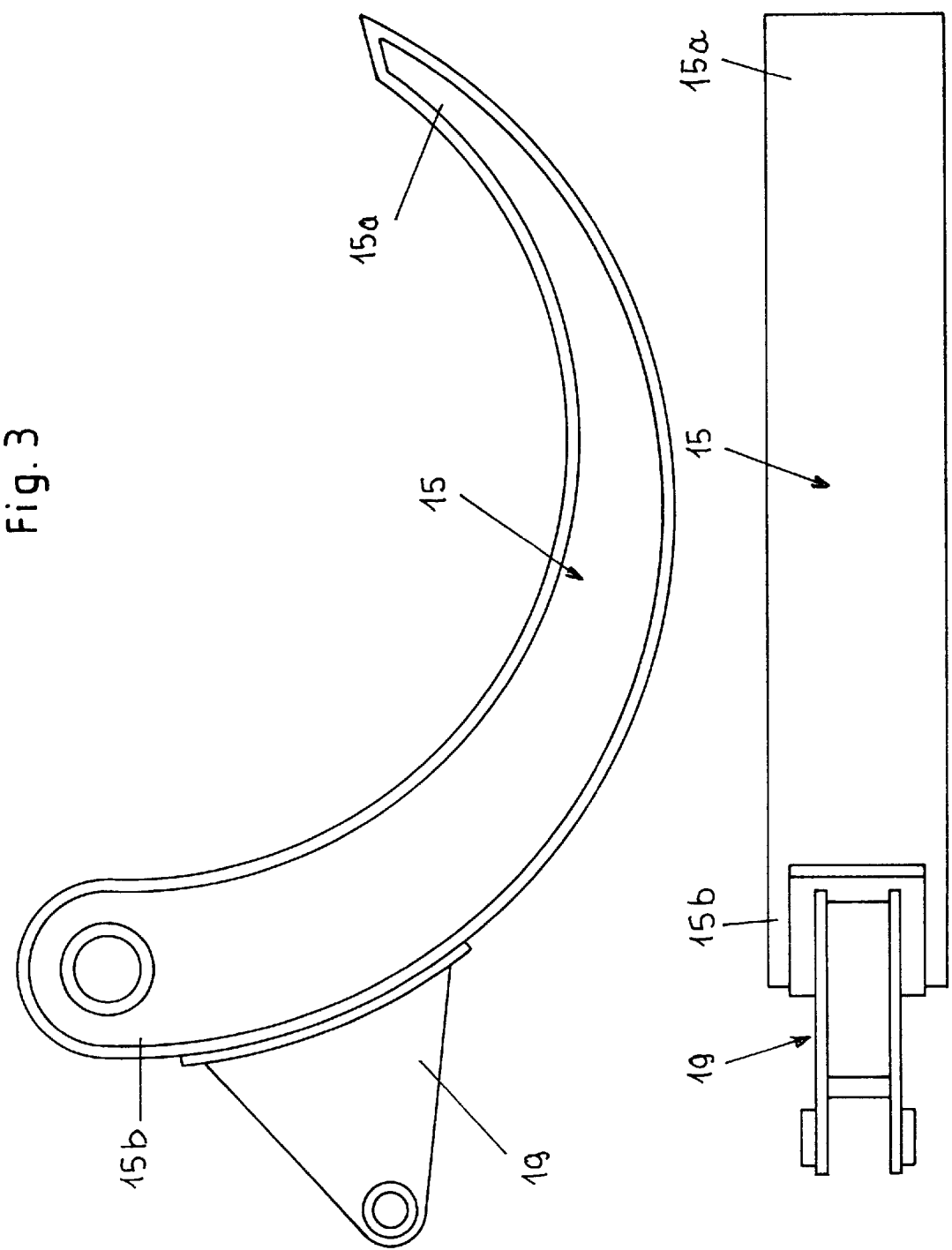

EQUIPMENT INCLUDING A MOTOR-DRIVEN CHAIN SAW FOR CUTTING BRANCHES FROM AND FELLING TREES

FIELD OF THE INVENTION

The invention relates to a device with a motor-driven chain saw for the disbranching and felling of trees.

BACKGROUND OF THE INVENTION

When divesting trees of their branches, especially tall trees, the problem frequently arises that persons or objects have to be protected from the cut-off, dropping branches. The motor-driven chain saws, due to their weight, can only be operated and guided with both hands of the operator, from which circumstance the necessity arises of a further auxiliary person having to hold the end of the branch that is being cut off. When Larger branches or tree trunks are involved, additional auxiliary means are required, by way of example in such a way that the branch to be severed has to be secured against falling down by means of ropes or other lifting tackle.

That is why the technical problem of the present invention is to construct a device of the type stated in the beginning in such a way that the severed workpieces, when cut, are secured against falling down without any additional supplementary means. According to the technical problem, the device is intended to be compatibly and safely operable by one person.

SUMMARY OF THE INVENTION

The technical problem is resolved by means of the device according to the present invention, is characterized by a seizing means for the workpieces to be cut, such as tree branches, tree trunks and suchlike, which is swivellable relative to the blade of the chain saw. With the seizing means, the branch to be severed from the tree is held during the cutting operation, whereby the hitherto necessary auxiliary person or other lifting means can be saved. Hereby, working with the chain saw according to the invention can be carried out more economically than has been possible up to now. This applies correspondingly to the cutting off of other objects, such as e.g. roof laths.

The entire equipment combination, comprising grabbing arms, their bearing brackets and the chain saw unit, in this case, is, with the aid of a slewing means that is capable of slewing this equipment combination in a vertical plane in each case through only 180° to the right or to the left, connected with the pertinent lifting means, such as a crane jib or excavator grapple. The chain saw unit itself, inclusive of the driving motor of the same, is swivellable across the cutting area with the aid of a swivel motor, to which the saw unit is attached direct. It is also possible for this operation to be executed by means of a further hydraulic cylinder when the same unit is mounted on a vertically disposed axis underneath the seizing means. Thus, according to a further construction of the invention, the seizing means is comprised of at least two, preferably though at least three, grabbing arms which are swivellable about a common axis or about mutually parallel axes. The grabbing arms, which are preferably configured so as to possess a sickle-like shape, are moved toward each other to such an extent that they come to force-lockingly embrace the workpiece portion released by the severance during the cutting operation and thereafter. By preference, the grabbing arms are in each case rotatably mounted on a shaft, they consequently constitute one-armed swivellable levers, which can be moved toward each other or aay from each other.

In a special construction of the invention, the device is, by means of a swivel motor, connected with a carrying support, with which the grabbing arms are connected direct or indirect. The carrying support which, by way of example, is fastened to other lifting means, such as ropes, chains or to a telescopic arm, with the aid of the swivel motor hinged hereon, make possible any angle of rotation adjustments of the grabbing arms and/or a swivelling of the chain saw blade about an axis of rotation which is located approximately parallel to the longitudinal axis of the workpiece to be cut. After the grabbing arms have been closed it is thus possible, by means of the swivel motor, to swivel the saw blade for the cut through the branch or some other workpiece. The carrying support preferably served both as carrier for the chain saw as well as carrier of a shaft that is disposed vertically to the cutting plane and is connected with the grabbing arms. When three or more grabbing arms are employed, it is consequently possible to provide a multipoint support for the workpiece to be cut off. By preference, both the saw blade as well as the seizing means can be driven by hydraulic or pneumatic means; more particularly with the aid of a common driving means, such as is customary e.g. on lifting equipment or hoisting vehicles.

For the intended use of the device, the carrying support is preferably rigidly connected to a telescopic arm or some other arm of a hoisting apparatus so that torques which occur subsequent to the sawing off of a tree part can be intercepted or absorbed. An attachment of the device to a crane jib or a similarly constructed hoisting means with the aid of chains or ropes is also possible, however, preference is given to the rigid attachment.

According to a further construction of the invention and for an enhanced security of the grabbing arms, each of the grabbing arms is connected with a hydraulic cylinder and can be driven with the aid of the latter, i.e. is swivellable. By means of the hydraulic cylinder, according to the pneumatic or hydraulic drive, powerful lever forces can be applied which ensure a secure gripping of the severed workpiece. In order to provide a compact device, also the hydraulic cylinders are rigidly connected with said carrying support.

Independently of the position of the carrying support and of the grabbing arms, the blade is preferably swivellable about the swivelling axis provided by the grabbing arms or their common shaft by an angle of rotation which sweeps at least across the surface area predetermined by the position of the grabbing arms. A high degree of functionality results hereby with regard to the mobility, particularly as regards the positioning of the chain saw in all directions in connection with a rotating possibility of the chain blade through up to 360°. It is possible to hereby reach or to work on any working point whatever in and on a tree.

As already hinted at in the foregoing, the device with the chain saw is by preference mounted in the form of an attachment on a telescopic arm, by way of example, on excavators, materials handling vehicles, cranes, lifting platforms or similar equipment.

According to a further construction of the invention, a control unit is additionally provided, with the aid of which all swivelling operations and the saw chain can be operated. Controlled are both the spatial alignment of the carrying supports, if necessary, by means of a ball-and-socket joint or the like, as well as the position of the angle of rotation of the grabbing arms in relation to the carrying supports, the opening and the closing of the grabbing arms and the swivelling as well as the speed of the sawing chain. Such a control unit can be operated in an operator-compatible fashion by a single person. By preference, the control unit is disposed in or on the driver's cab of a vehicle equipped with a telescopic arm so as to enable the driver to control all the described operating procedures from the cab.

The device is distinguished from the equipment employed in the timber industry inasmuch as the cut-off material is retained in its previous position and can be deposited selectively and defined according to the cut.

BRIEF DESCRIPTION OF THE DRAWING

An embodiment example of the invention is illustrated in the drawings. Thus

FIG. 3 shows a side view of a grabbing arm;

FIG. 4 shows a view from above onto the grabbing arm as per FIG. 3 with a mounting means for the lifting cylinder;

DETAILED DESCRIPTION OF THE INVENTION

Figure 1:
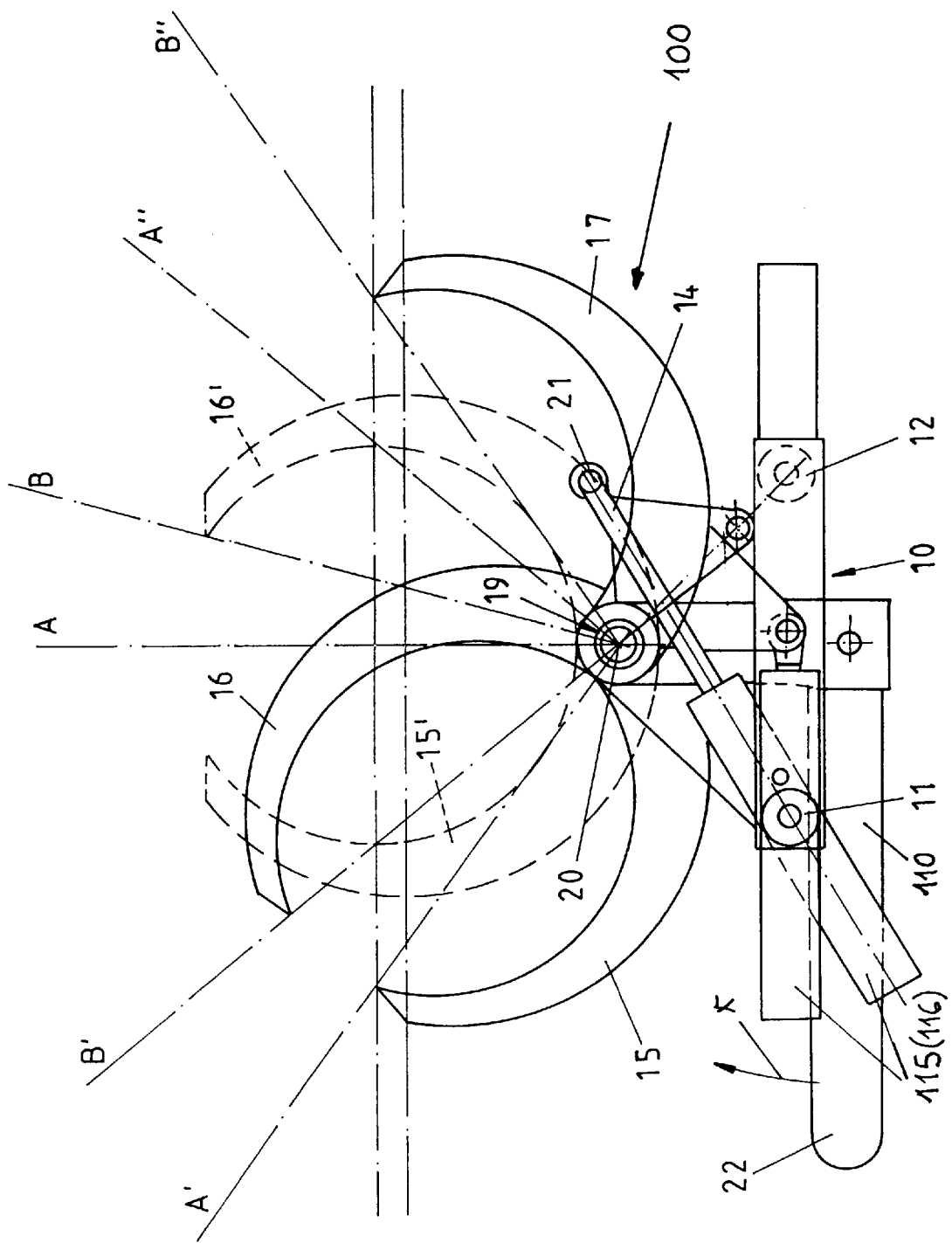
FIG. 1 shows a side view of a device with a chain saw for the disbranching and felling of trees.
Figure 5:
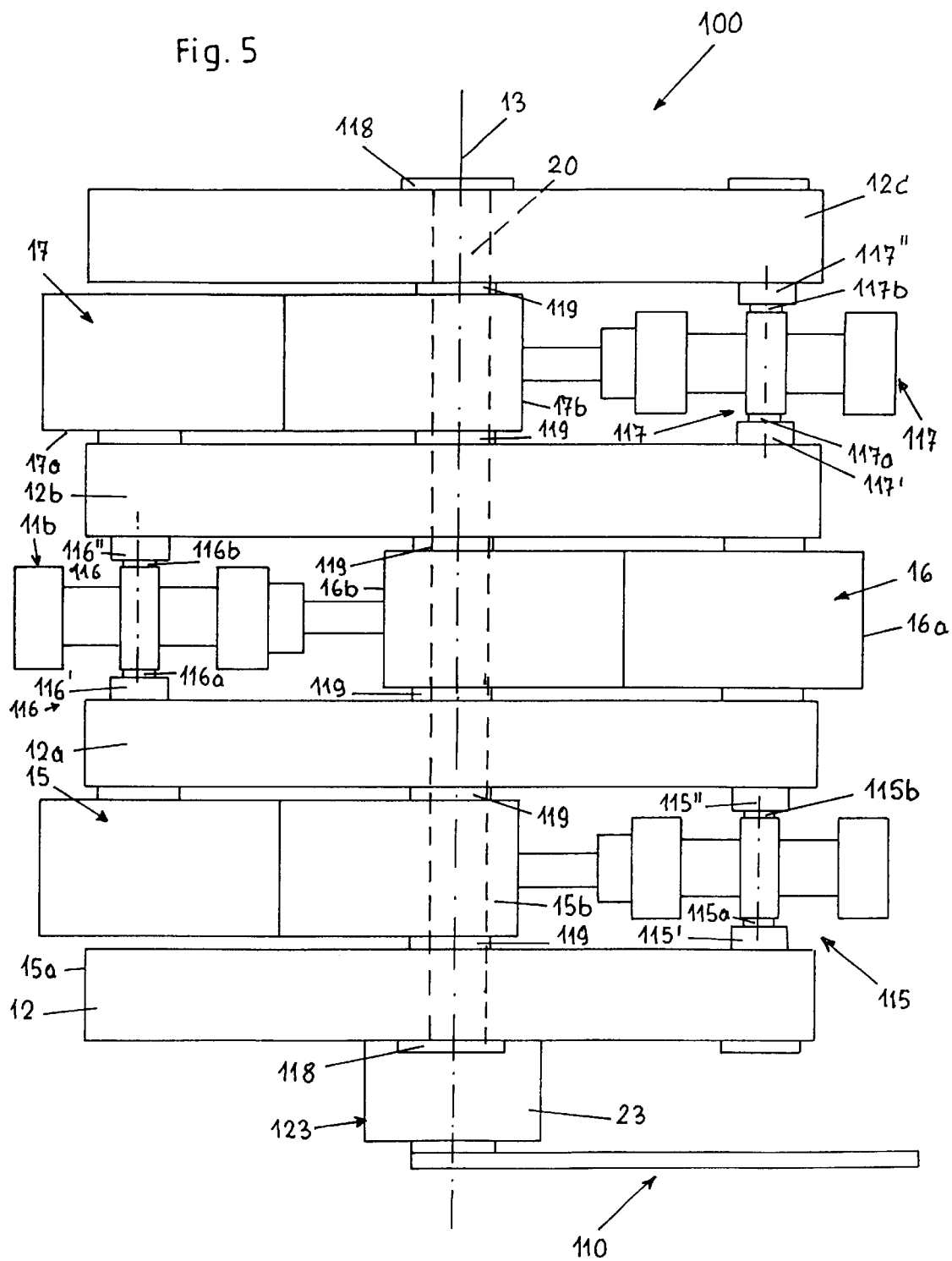
FIG. 5 shows a front view of the device constructed in the form of a tree-cutter and FIG. 6 shows a side view of the device with base frame, bracket and grabbing arms.
Figure 6:
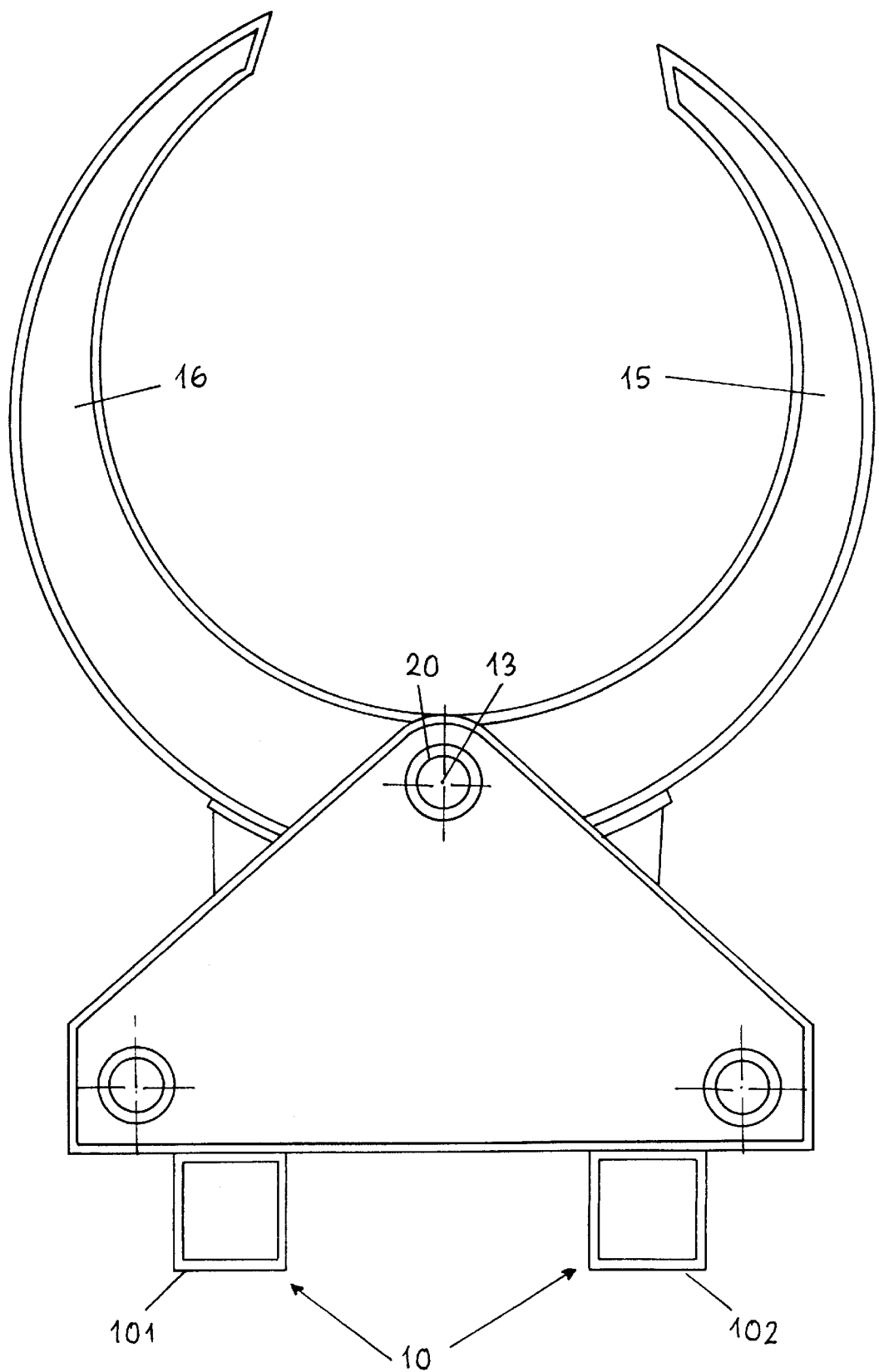

The tree disbranching and felling device 100 is, according to the FIGS. 1,5 and 6, comprised of a base frame in the form of carrying support 10 with two frame portions 101, 102 of preferably square sections with a plurality of triangular brackets 12,12a,12b,12c disposed upon the latter, which, with their bases, are attached to the square sections, whereas in the embodiment example as per FIG.6, four brackets are provided, in which case, between the brackets 12,12a, the brackets 12a,12b and the brackets 12b,12c, one grabbing arm each 15,16,17 is rotatably reteined, while upon each grabbing arm 15,16,17, a hydraulic cylinder 115,116,117 acts in such a way that their extensible piston 14, at the end, is connected with the grabbing arm 15 or 16 or 17 so as to enable the same to swivel the grabbing arms about their axes 13 (FIG.6). For this, the grabbing arms 15,16,17 are, with their ends, rotatably journalled on a shaft 20 (FIGS. 1 and 6). The swivel axes 13 of all grabbing arms 15,16,17 are flush with and form the center axis of the overall device.

Each hydraulic cylinder 115,116,117 is supported in each case between two brackets 12,12a and 12a,12b and 12b, 12c with the aid of bearing journals or swivelling journals 115a, 115b and 116a, 116b and 117a, 117b in bushes located opposite to each other 115',115" and 116',116" and 117', 117", for which provision is made on the brackets 12,12a, 12b,12c. The bearing or swivelling journals 115a,115b,116a, 116b,117a,117b are preferably permanently cast integrally on the hydraulic cylinders 115, 116,117.

The frame portions 101,102 of the carrying supports 10 are preferably interconnected in cross-type bracings so as to make it possible to rotate the overall device 100 about its center longitudinal axis.

Each grabbing arm 15,16,17 is, at its end 15b,16b,17b facing away from the free end 15a,16a,17a, provided with a mounting means 19 for the hydraulic cylinder 115,116, 117 (FIGS. 1,3 and 4). Within the area of rotation of each grabbing arm 15,16,17, on both sides of each grabbing arm between the same and the brackets 12,12a,12b,12c, bearing disks 119 are disposed, through which the shaft 20 is passed. In the two outermost brackets 12,12c, the shaft 20 is secured against slipping out from the brackets at 118 with the aid of cap-like or cover-like elements (FIG. 5).

Figure 2:
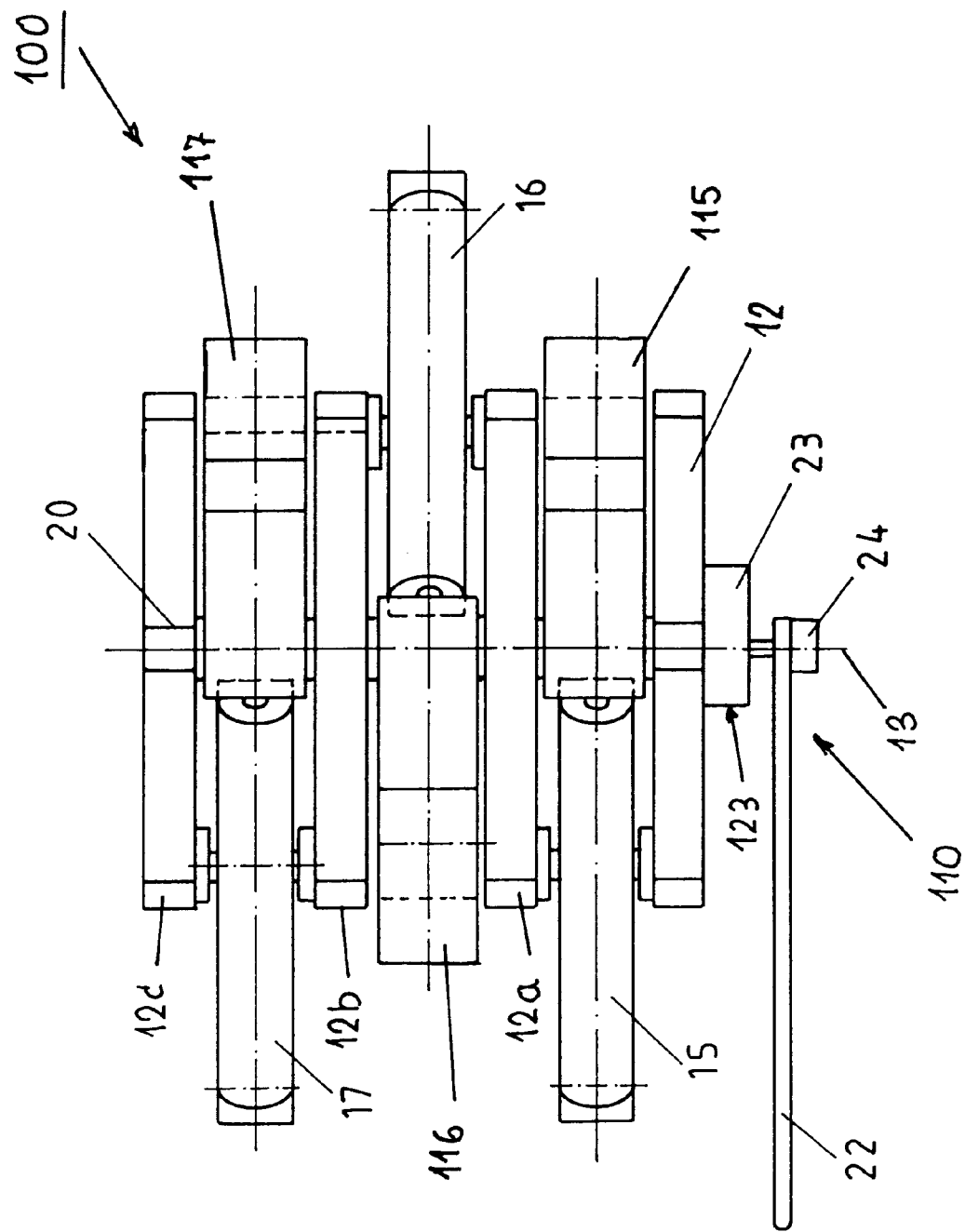
FIG. 2 shows a view from the top onto this device.

On the external wall area of the bracket 12 or the carrying support, by means of a swiveling device 123, which e.g. is constructed in the form of a swivel motor 23, the chain saw 110 with a saw blade from the blade with revolvingly driven saw chain is swivellably hinged on. The chain saw 110 is equipped with a speed-controllable motor 24 (FIG. 2). The chain saw 110 is thus, independently of the torsional possibility of the overall device, swivellable relative to the same and the grabbing arms 15 to 17.

On the carrying support 10 or the brackets 12,12a,12b, 12c of the same, the hydraulic cylinders 115,116,117 are attached, whose extensible piston 14, at the end, is connected with a grabbing arm 15,16,17. Each of the grabbing arms 15,16 and 17 depicted here is connected with such a hydraulic cylinder. The carrying support 10 or the brackets of the latter accommodates the shaft 20, on which the grabbing arms 15,16,17 are rotatably mounted. The grabbing arms 15,16 and 17 are each constructed so as to possess a sickle-like configuration and are individually swivellable into any angle of rotation positions relative to the shaft 20, more particularly, in each case, two adjacent grabbing arms 15 and 16 are swivellable toward each other so that a workpiece, e.g. a branch, is introduced approximately in the opening state relative hereto, can be force-lockingly embraced by means of a motion toward each other of the grabbing arms 15 and 16. The third grabbing arm 17 is likewise swivellable so that it can be brought up to the same workpiece as additional support. The concave surface areas of the grabbing arms 15,16 and 17 can be provided with a corrugated surface profile so as to ensure a better gripping of smooth workpieces. A second rotational position of the grabbing arms 15 and 16 in a continued opened state is drawn in by means of a dashtine representation 15' and 16'. The respective ends of the pistons 14 are hinged onto the convex outside of each grabbing arm 15,16 and 17 by means of a ball-and-socket joint 21. Likewise rotatably hinged onto the carrying support 10 is the chain saw with a blade 22 known in principle from the state of the art, which is rotatable in the direction of the arrow X (or in the opposite direction of rotation). A revolving saw chain is guided on this blade 22.

Preferably, but not depicted, the carrying support 10 is secured to the end of a telescopic arm, which may form part of an excavator, crane or of any materials handling vehicle.

The device according to the invention with the motor-driven chain saw is thus utilizable in the form of a tree cutter as a hydraulically operated attachment for mounting onto commercially available, standardized or non-standardized equipment carriers equipped with telescopic arms, on material handling vehicles, excavators, cranes and vehicles appearing to be similarly suitable. The mechanisms of the tree cutter are designed for a hydraulic drive. The tree cutter enables the user, with the aid of a commercially available telescopic excavator or a telescopic crane, onto whose equipment accommodation means it is mounted and with whose hydraulic circuit it is made to communicate, to carry out light to heavy felling and pruning operations on trees in a rational, safe and expeditious manner and with a low expenditure on personnel with the highest degree of mobility. The device according to the invention can be brought into operation in a mobile and effective manner with fire departments, in disaster procedures when trees have been felled and damaged by strong winds and/or by lightning. The high degree of functionality results from the mobility of the tree cutter according to the invention which, with the aid of the driving vehicle, can be positioned in all the directions, in which case the carrying support can, from a zero position, be swivelled up and down and, with the aid of the described slewing means for the chain saw, is rotatable about its own center axis through altogether 360°. Any working point whatever in or on a tree can be reached and worked on hereby. Over and above that, the device is also suitable for the handling of already lying tree trunks as well as for the loading or discharging of long-cut timber, that is to say, if necessary, without operating the saw. Preferably, the grabbing arms of the chain saw according to the invention are moved with the aid of hydraulic cylinders, which are integrated into the carrying supports or a chassis. Each grabbing arm 15 to 17 is provided with a hydraulic cylinder of its own so that a high degree of adaptability to every uneven, non-circular, conical or crooked tree trunk surface is ensured. By preference, the saw chain is mounted upon a hydraulic motor driving the saw chain.

The control of the device according to the invention can be effected from a driver's seat of the driving vehicle or from some other mobile operating unit. The handling then takes place with the aid of an electronically controlled single lever control for all axes of movement of the seizing means, the cutting operation by means of a, possibly, separate single lever control of its own. If a vehicle with telescopic arm is employed for the operations, in that case the same, prior to the device according to the invention being used, has to be tested for the adequate performance of its onboard hydraulic system or, if necessary, to be retro-fitted with a more efficient hydraulic system. The hardware and software necessary for the control of the device according to the invention as well as of the control units have to be mounted in an appropriate manner. The hydraulic connection can be effected with the aid of normal plug-in couplings, likewise the electronic control lines can be connected with the aid of collective connector. For the initial operation, the vehicle is placed in front of a tree to be pruned or felled, whereupon the lateral vehicle-mounted supports are extended. The telescopic arm, on whose end the motor-driven chain saw is mounted, is moved to the position in or on the tree from which a branch possessing a thickness appropriate to the seizing means is to be removed. The seizing means, with the aid of the control unit of the device, is brought into the position in which it is possible to seize the branch in the best possible manner. On this occasion the saw or some other knife cutting unit is stood on the side which faces the part of the tree which is to be left standing. After the seizing of the branch under electronic control and the control of the application force of the grabbing arms 15 to 17, the hydraulic chain saw, i.e. the blade 22, is set into rotation, that is to say in the direction of the arrow 123 while the saw chain is running, where, subjected to suitable contact pressure, this motion is continued until the branch is cut off. After the cutting off of the branch the same remains first in the grabbing arm mounting until the same is reopened. The blade 22 of the chain saw, after the branch has been removed, can be caused to travel back again or to remain in the terminal position. Preferably the seizing means 15 to 17 is also used for transporting the cut branch to a vehicle or to a depositing point.

The felling of trees is also possible with the device according to the invention, in which case it is preferred that the branches are first removed one after the other as described and the tree trunk is subsequently divided into individual segments and deposited on a loading vehicle or at a depositing point.

The aforedescribed operations can be carried out completely by a single operator without the aid of further equipment or machines. Not only does this save labour, but also further operations such as holding the severed tree trunk or securing this trunk by means of ropes or a crane.

The employment of the device according to the invention renders the described cutting operations significantly safer, it is possible, moreover, to also execute said operations more expeditiously and economically. It is possible to entirely dispense with working platforms or other auxiliary equipment or material.

The grabbing arms 15,16,17 are swivellable about a common axis, however, a disposition of the grabbing arms on several individual axes is also possible.

We claim:

1. A device with a motor-driven chain saw for the disbranching and felling of trees, comprising:

a carrying support secured in a fixed position;

a plurality of grabbing arms swivellable about one of a common axis and mutually parallel axes within the carrying support, such that the grabbing arms come to force-lockingly embrace a portion of the tree desired to be removed;

a chain saw having a blade with a saw chain operatively connected to a driving motor;

means connecting the carrying support to the chain saw for swiveling the chain saw into the portion of the tree force-lockingly embraced by the grabbing arms such that the portion of the tree force-lockingly embraced by the grabbing arms is separated from the remainder of the tree by the chain saw.

2. The device according to claim 1, wherein the number of grabbing arms is two.

3. The device according to claim 1, wherein the number of grabbing arms is three.

4. The device according to claim 1, wherein the grabbing arms possess a sickle-like configuration.

5. The device according to claim 1, wherein the blade of the chain saw, the saw chain, and the grabbing arms are driven hydraulically.

6. The device according to claim 1, wherein the blade of the chain saw, the saw chain, and the grabbing arms are driven pneumatically.

7. The device according to claim 1, wherein a hydraulic cylinder operatively connects the grabbing arm to the carrying support.

8. The device according to claim 1, wherein the means connecting the carrying support to the chain saw is a swivel motor.

9. The device according to claim 1, wherein the means connecting the carrying support to the chain saw is a hydraulic cylinder.

* * * * *